United States Patent
Wu et al.

(10) Patent No.: US 7,535,511 B2
(45) Date of Patent: May 19, 2009

(54) AUTOMATIC EXPOSURE CONTROL METHOD AND AUTOMATIC EXPOSURE COMPENSATION APPARATUS

(75) Inventors: Cheng-Yu Wu, Hsinchu (TW); Zhe-Hong Lin, Puli Township, Nantou County (TW); Hung-ren Chen, Ching-Shuei Township, Taichung County (TW)

(73) Assignee: Sunplus Technology Co, Ltd., Hsinchu (TW)

( * ) Notice: Subject to any disclaimer, the term of this patent is extended or adjusted under 35 U.S.C. 154(b) by 573 days.

(21) Appl. No.: 11/453,424

(22) Filed: Jun. 14, 2006

(65) Prior Publication Data

US 2007/0115372 A1 May 24, 2007

(30) Foreign Application Priority Data

Nov. 24, 2005 (TW) .............................. 94141251 A

(51) Int. Cl.
*H04N 5/238* (2006.01)
(52) U.S. Cl. .................. 348/364; 348/230.1; 348/222.1
(58) Field of Classification Search .............. 348/221.1, 348/229.1, 230.1, 362–366
See application file for complete search history.

(56) References Cited

U.S. PATENT DOCUMENTS

| | | | |
|---|---|---|---|
| 5,703,644 A | 12/1997 | Mori et al. .................. 348/363 |
| 6,690,424 B1 | 2/2004 | Hanagata et al. ............ 348/364 |
| 6,853,806 B2 | 2/2005 | Nakata et al. ................. 396/56 |
| 6,879,345 B2 * | 4/2005 | Kawanishi ................... 348/362 |
| 6,950,141 B2 * | 9/2005 | Mori et al. ................... 348/362 |
| 7,023,484 B2 * | 4/2006 | Watanabe ................... 348/364 |

* cited by examiner

*Primary Examiner*—Lin Ye
*Assistant Examiner*—Gevell Selby
(74) *Attorney, Agent, or Firm*—J.C. Patents

(57) ABSTRACT

An automatic exposure control method and compensation apparatus are disclosed. It includes a coordinate system having sub-ranges with different corresponding exposure compensation values. It includes the setting of bright and dark regions threshold values and the calculation of the ratios of the pixel count in an image where the luminance of each pixel is higher than the bright area threshold value for obtaining a bright area ratio, and also includes the calculation of the ratio of the pixel count in an image where the luminance of each pixel is lower than the dark area threshold value for obtaining a dark area ratio. Afterwards, the image position in the coordinate system is determined. When the image position in the coordinate system is fallen inside one of the sub-ranges, the corresponding exposure compensation value of the sub-range where the image is located is given to compensate the exposure value of the image.

19 Claims, 13 Drawing Sheets

AUTOMATIC EXPOSURE CONTROL METHOD AND AUTOMATIC EXPOSURE COMPENSATION APPARATUS

CROSS-REFERENCE TO RELATED APPLICATION

This application claims the priority benefit of Taiwan application serial no. 94141251, filed on Nov. 24, 2005. All disclosure of the Taiwan application is incorporated herein by reference.

BACKGROUND OF THE INVENTION

1. Field of Invention

The present invention relates to an automatic exposure control method and an automatic exposure compensation apparatus, and particularly to an automatic exposure control method and an automatic exposure compensation apparatus used for setting the exposure compensation value of an image.

2. Description of the Related Art

The components of a color image processing system mainly include an image acquisition unit, an image regression and processing unit, an image display unit, and an image compression unit. In which, the image acquisition unit is formed by an image sensor, which is a two-dimensional array device formed by a plurality of photo-diodes and which converts a detected optical intensity into an electronic signal to be provided for the subsequent image regression and processing unit to perform the appropriate image processing. Since the direction and intensity of a light source for a photographic scene is varied, an excessively bright or dark principal object frame is as a result. An exposure control is intended to control the intensity and time duration of the supplementary lighting under various scene conditions for correcting the excessively bright or dark principal object frame caused by the luminance difference between the principal object and the background.

Accordingly, many manufactures have developed a number of light-metering methods to improve the exposure of the principal object in a photographic frame. However, a general-purpose light-metering method is not capable of effectively alleviating the problem. As a prior art, for example, Matsushita Electric Industrial Co. provided the U.S. Pat. No. 5,703,644 with title of "Automatic Exposure Control Apparatus", in which a frame is divided into a plurality of smaller element blocks having a calculated average luminance of each block. Afterwards, the calculated average luminance of the blocks are sequentially arranged by the corresponding magnitude; and a histogram of the block count versus the average luminance is generated, followed by the classification of all the element blocks into a principal object region and a background region. Then, based on the calculated average luminance of the selected smaller element blocks, the exposure correction of the backlighting and the strong front lighting scene is performed. Using the above scheme, an up-down and left-right positional or orientational variations would likely produce a misjudgement of image frame of a scene. FIG. 1 is, for example, a diagram showing a misjudgement of an image frame of a scene using the method provided by U.S. Pat. No. 5,703,644. According to the aforementioned patent, a scene 102 is divided into two regions, the principal object region 104 locating in the center portion of the scene and the background region 106 locating in the peripheral portion of the scene. When the subject (the principal object) to be photographed is moved to the left from a position 108 to a position 110, the current principal object region 104 would be substituted by a background. Since the background is a brighter region (for example, the background is the sky), the sky would be misjudged to be the principal object to have excessive luminance and an incorrect negative compensation, i.e. a deducted lighting, would be performed, which leads to the above-described misjudgement of an image frame of a scene.

To overcome the disadvantage of an excessively bright or dark principal object in a photographic frame, another prior art by Sony Corporation provided the U.S. Pat. No. 6,690,424 in title of "Apparatus for Controlling the Exposure of an Image Pickup Plane in a Camera." Indeed, the art provided by the aforementioned patent is for an exposure control method for backlighting scenes, which sets two luminance reference values according to the average luminance value of the entire frame and divides the frame into a principal object region and a background region based on the two luminance reference values, followed by calculating an average luminance difference between the entire frame and the principal object region. By using the aforementioned difference value, an exposure compensation gain can be determined. The aforementioned method is able to improve the accuracy of judgement of image frame in a scene when the principal object has an up-down and left-right positional or orientational variation. However, the aforementioned method would still fail to provide a correct judgment when a principal object is under strong front lighting. FIG. 2 is, for example, a diagram showing a misjudgement of an image frame of a scene using U.S. Pat. No. 6,690,424. In which, the abscissa represents the average luminance (Y), and the ordinate represents the pixel count. The two lines with down arrows indicate the two luminance reference values, 202 and 204; and Y indicates a luminance difference between the two luminance reference values. For a distribution curve 206 in the diagram, the method provided by the aforementioned patent would provide the judgement of the photographic scene under a backlighting situation and a positive compensation is performed accordingly. However, a similar distribution curve 206 under strong front-lighting can be presented as well; therefore, a misjudgment of the photographic scene as a back-lighting situation and a positive compensation given based on the method of the aforementioned patent would make the result even worse, so that an originally strong front lighting scene becomes even more brighter, thus is indicative of a case of misjudgement of a image frame of a scene.

Furthermore, another U.S. Pat. No. 6,853,806 provided by Olympus Optical Co. having title of "Camera with an Exposure Control Function" is another conventional exposure control method for back-lighting scenes. In which, a distance metering sensor is used; and the average luminance of an entire frame is calculated for determining the position of a principal object in the frame, and followed by using a back-lighting assessment unit for determining the intensity and duration of an exposure. To carry out the method in the aforementioned patent, a camera must be equipped with a distance metering sensor, which results in structural complexity and increased cost.

SUMMARY OF THE INVENTION

An object of the present invention is to provide an automatic exposure control method for determining the exposure compensation values of images. The method uses a preferred image analysis algorithm suitable for various photographic scenes, such as under back-lighting, strong front-lighting or dark situations for performing the proper exposure compensations. Nevertheless, the method is also able to maintain the preestablished exposure value (EV) for photographic scenes having normal front-lighting or high-light scenes.

Another object of the present invention is to provide an automatic exposure compensation apparatus for performing reasonable exposure compensations on the acquired image frames of a scene in association with the automatic exposure control method of the present invention.

Based on the above-described objects, the present invention provides an automatic exposure control method, which includes the establishment of a coordinate system, in which the coordinate system has a plurality of sub-ranges corresponding to different exposure compensation values, a bright region threshold value and a dark region threshold value are set, the ratio of the pixel count for the pixels of the image with a luminance higher than the bright region threshold value over the total pixel count of the entire image is calculated for obtaining a bright area ratio, and the ratio of the pixel count for the pixels of the image with a luminance lower than the dark region threshold value over the total pixel count of the entire image is calculated for obtaining a dark area ratio. Furthermore, according to the bright area ratio and the dark area ratio, the position of the image in the coordinate system is determined. Finally, according to the sub-range of the coordinate system where the position of the image is located in, the corresponding exposure compensation value of the sub-range where the image is located is given to compensate the exposure value (EV) of the image.

Based on the above-described object, the present invention provides an automatic exposure compensation apparatus, which includes a luminance statistic unit, an index calculation unit, and a lookup table. In which, the luminance statistic unit is used for conducting the metering for obtaining the pixel count of the bright region, in which the luminance is higher than the predetermined bright region threshold value, and for obtaining the pixel count of the dark region, in which the luminance is lower than the predetermined dark region threshold value. The input end of the index calculation unit is coupled to the output end of the luminance statistic unit for producing at least one index according to the pixel count of the bright region and the dark region. The input end of the lookup table is coupled to the output end of the index calculation unit for retrieving an exposure compensation value corresponding to the indexes.

From the aforementioned, it is clear that the present invention uses a image analysis algorithm to properly define the exposure value (EV) corresponding appropriately to each scene. Since a variety of typical conditions encountered in a photographic scene, such as high-lighting scene, normal front-lighting, back-lighting, strong back-lighting, strong front-lighting, and dark scene are considered and included in a plurality of sub-ranges in the established coordinate system. Furthermore, each captured image to be shot is already determined by the bright area ratio and the dark area ratio to decide at the appropriate position in the coordinate system, followed by the proper compensation of the EV of the image according to the corresponding exposure compensation value of the sub-range in which the image is located; therefore, the method provided by the present invention is unlikely to lead to a misjudgement of image frame of a scene, thus each scene situation is able to obtain a proper exposure compensation.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve for explaining the principles of the invention.

DESCRIPTION OF THE EMBODIMENTS

To reduce the chance of misjudgement with exposure in the scene and to assure every scene to obtain proper exposure compensation, the present invention provides an automatic exposure control method different from the prior art. The method is explained by means of the disclosed embodiments together with the accompanying drawings as follows.

Figure 1:
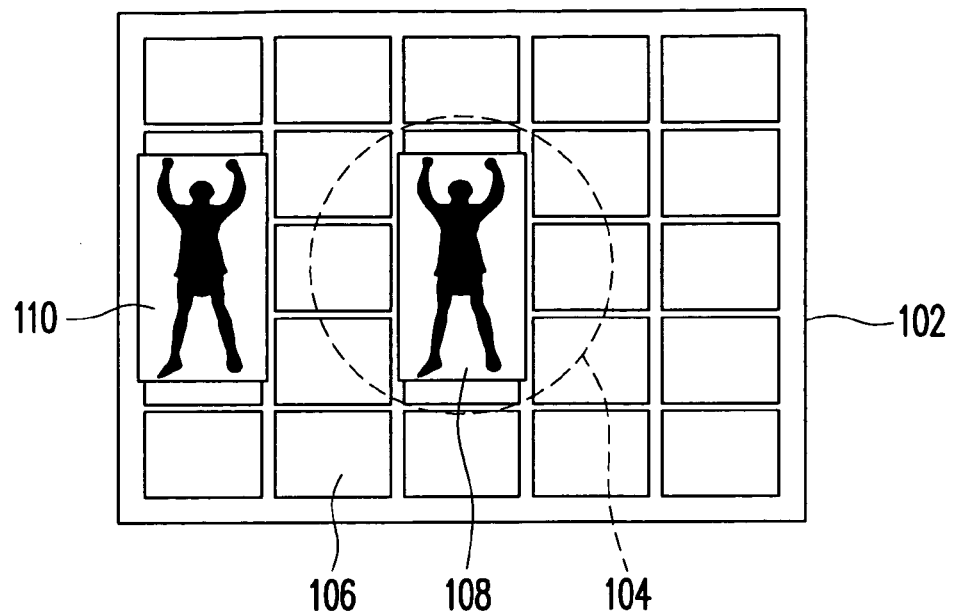
FIG. 1 is a schematic diagram showing a misjudgement of an image frame of a scene using the method provided by U.S. Pat. No. 5,703,644.
Figure 2:
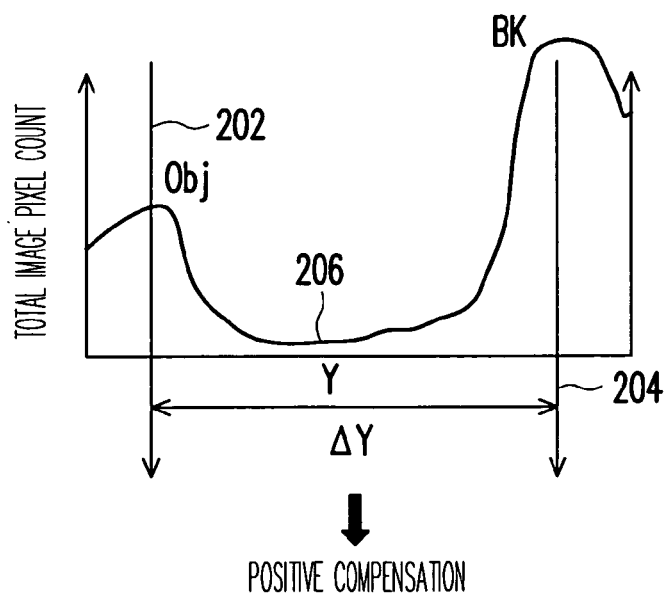
FIG. 2 is a schematic diagram showing a misjudgement of an image frame of a scene using the method provided by U.S. Pat. No. 6,690,424.
Figure 3:
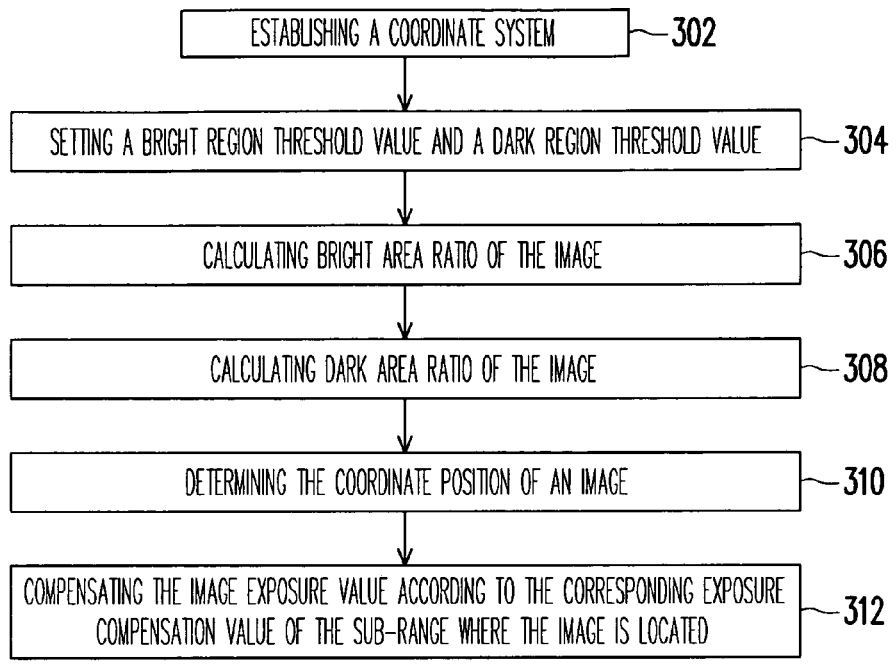
FIG. 3 is a flowchart of an automatic exposure control method according to an embodiment of the present invention.
Figure 4:
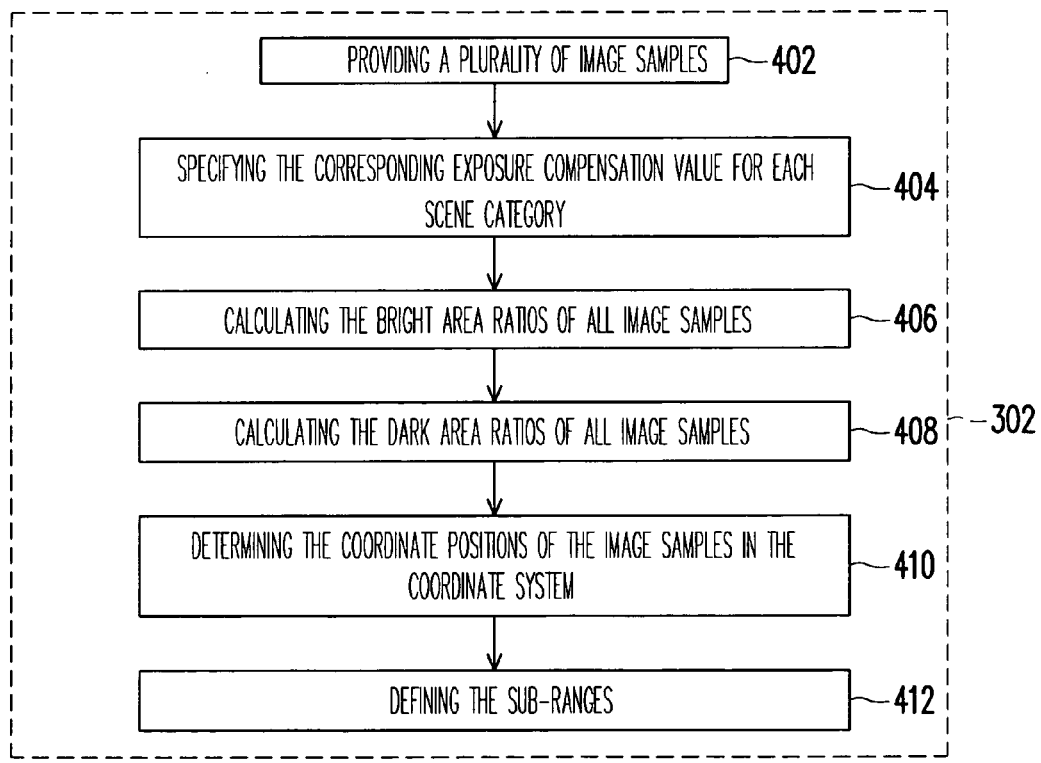
FIG. 4 is a flowchart for the establishment of a coordinate system according to an embodiment of the present invention.
Figure 5A:
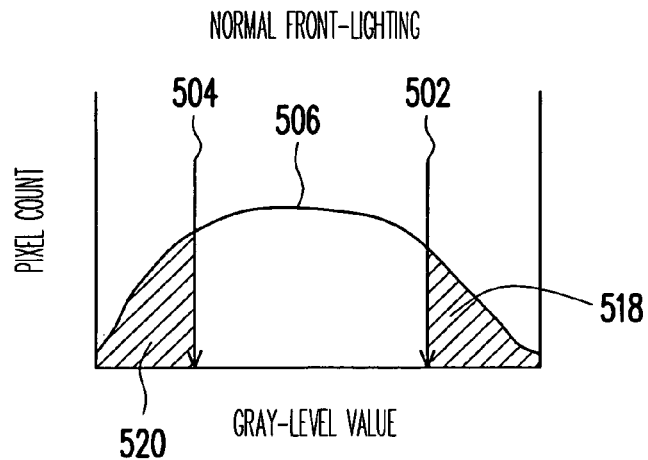
FIGS. 5a, 5b, 5c, 5d, 5e and 5f are a plurality of luminance histograms corresponding to a variety of scenes, according to an embodiment of the present invention.
Figure 5B:
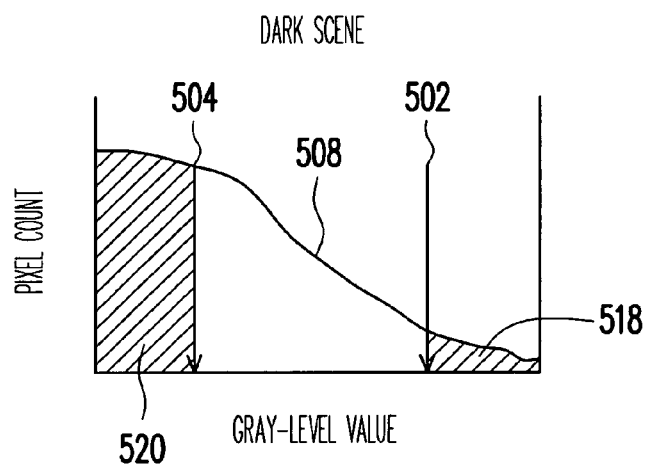
Figure 5C:
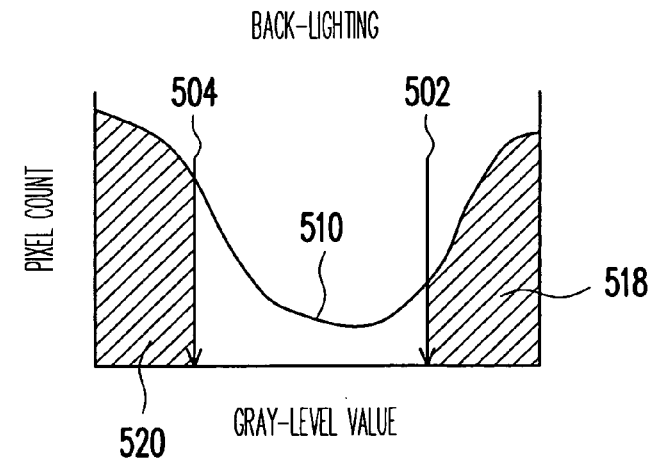
Figure 5D:
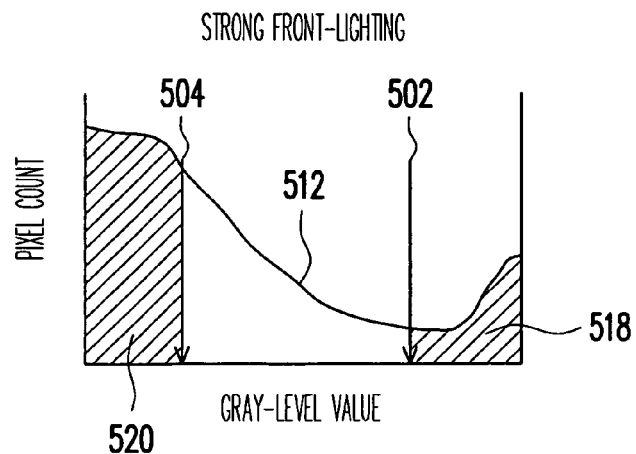
Figure 5E:
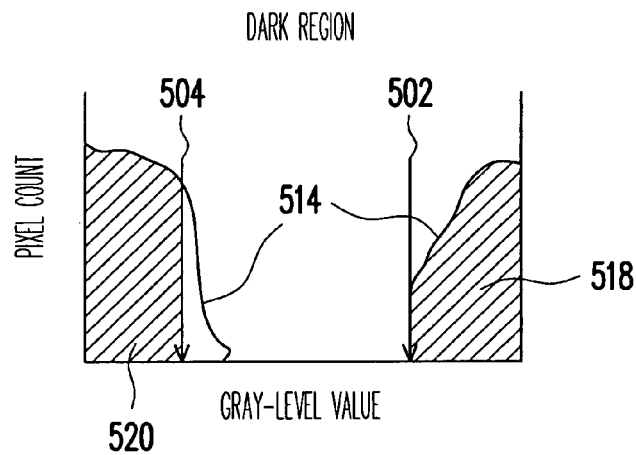
Figure 5F:
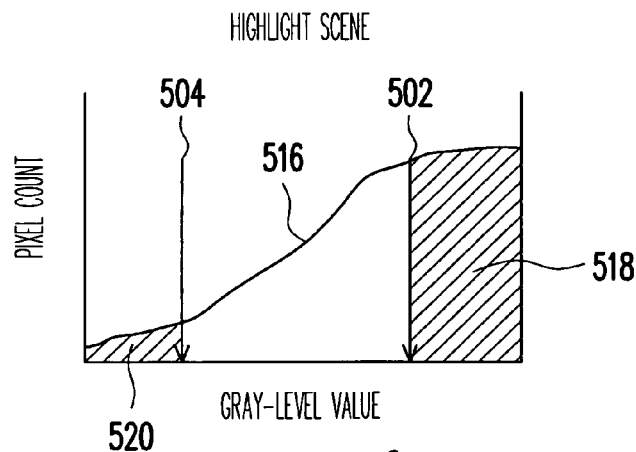

FIG. 3 is a flowchart of an automatic exposure control method according to an embodiment of the present invention. Referring to FIG. 3, six steps are included, which include a plurality of steps 302, 304, 306, 308, 310 and 312. In which, step 302 is to establish a coordinate system. Referring to FIG. 4, a flowchart for establishing a coordinate system according to an embodiment of the present invention is illustrated.

Six sub-steps in total are included for step 302, which are a plurality of sub-steps 402, 404, 406, 408, 410 and 412, as shown in FIG. 4. First, at the sub-step 402, a plurality of image samples are provided. Next at the sub-step 404, the exposure compensation value corresponding to each scene category is assigned, which can be better understood by referring to FIGS. 5a-5f, which include a plurality of luminance histograms corresponding to a variety of scenes according to an embodiment of the present invention. In which, the gray-level value is represented by the abscissa and the pixel count is represented by the ordinate. In FIGS. 5a-5f, there are two lines with downward arrows 502 and 504, which represent a bright region threshold value and a dark region threshold value for defining a bright region 518 and a dark region 520, respectively. In general, the exposure of a photographic scene can be divided into several categories: normal front-lighting, dark scene, back-lighting, strong front-lighting, strong back-lighting, and highlight scene, and which are corresponded to a plurality of distribution curves 506, 508, 510, 512, 514 and 516 in a plurality of luminance histograms shown in FIGS. 5a-5f, respectively. It is clear that the luminance distribution curves of the images have different shapes under different scene conditions in FIGS. 5a-5f, which in particular, the acquisition image pixel counts in the bright regions and the dark regions of the luminance histogram for the corresponding scenes have different characteristics. The distribution curve 506 represents an ideal scene; therefore, all other remaining scenes corresponding to the distribution curves 508, 510, 512 and 514 would be corrected according to the assigned corresponding exposure compensation values for achieving the same effects as the ideal scene.

Figure 6:
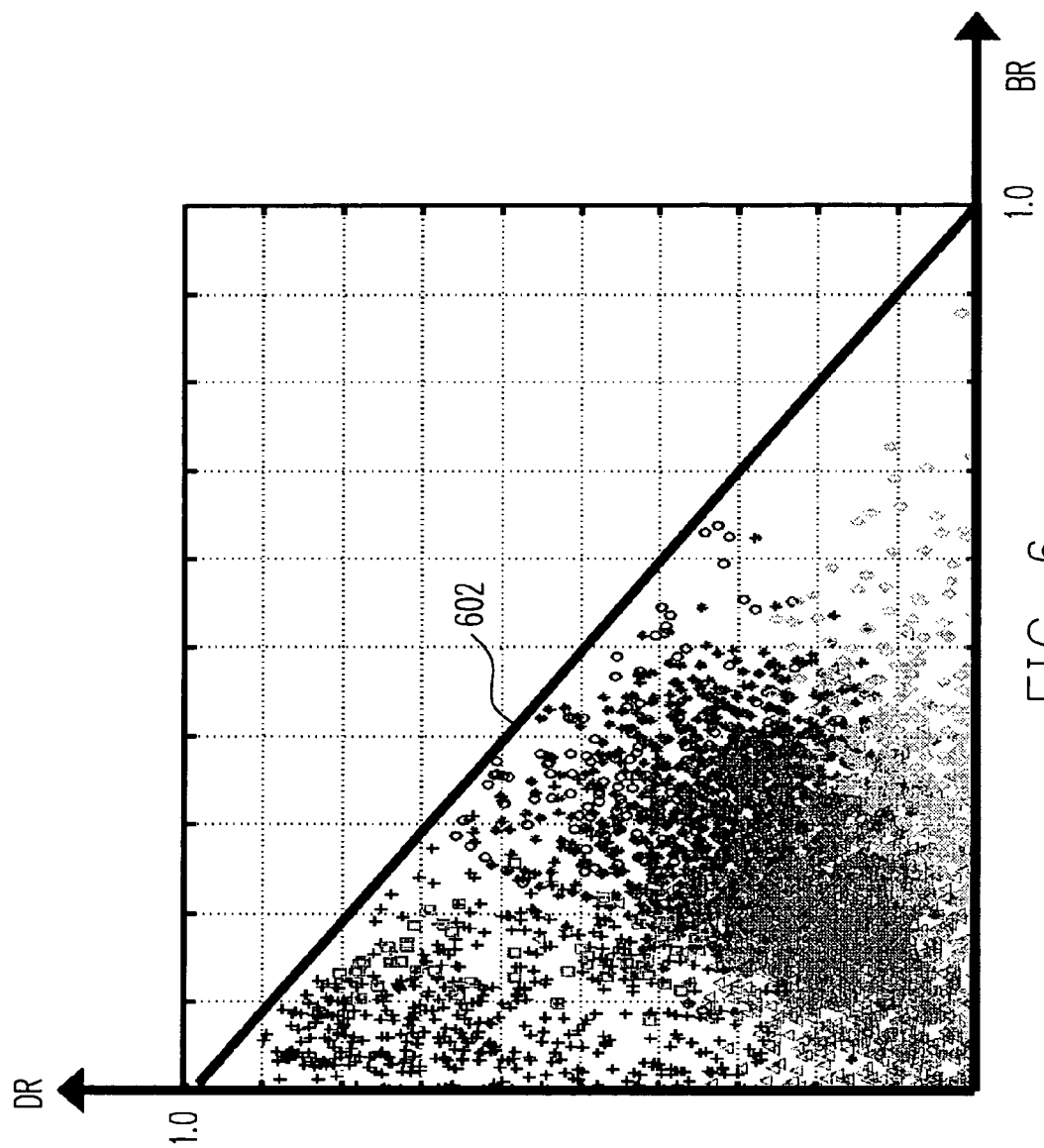
FIG. 6 is a plotted chart of a coordinate system according to an embodiment of the present invention.

Afterwards at the sub-step 406, it is to calculate the bright area ratios of all image samples, in which a bright area ratio is obtained by tabulating the total count of pixels with a luminance higher than the bright region threshold value (by tabulating the pixel count of the bright region 518), followed by calculating the ratio of the pixel count of the bright region over the total image pixel count. Then at the sub-step 408, it is for calculating the dark area ratios of all image samples, in which a dark area ratio is obtained by tabulating the count of pixels with a luminance lower than the dark region threshold value (by tabulating the pixel count of the dark region 520), followed by calculating the ratio of the pixel count of the dark region over the total image pixel count. Further at the sub-step 410, it is for determining the positions of the image samples in the coordinate system. FIG. 6 is a plotted chart of a coordinate system according to an embodiment of the present invention. Referring to FIG. 6, the abscissa X (BR) represents the bright area ratio of the image and the ordinate Y (DR) represents the dark area ratio of the image. A massive amount of image statistic data are obtained from various scenes and the statistic data are plotted on the coordinate plane. Thus, a bright area ratio and a dark area ratio which correspond to every image sample would be forming to a data point on the coordinate plane. Considering that the maximum summation value of any pair of a bright area ratio and a dark area ratio is '1', therefore, all the above-described coordinate points must fall inside the lower sector below an oblique line 602 in FIG. 6; and the oblique line 602 can be expressed by the equation $X+Y=1$.

Figure 7:
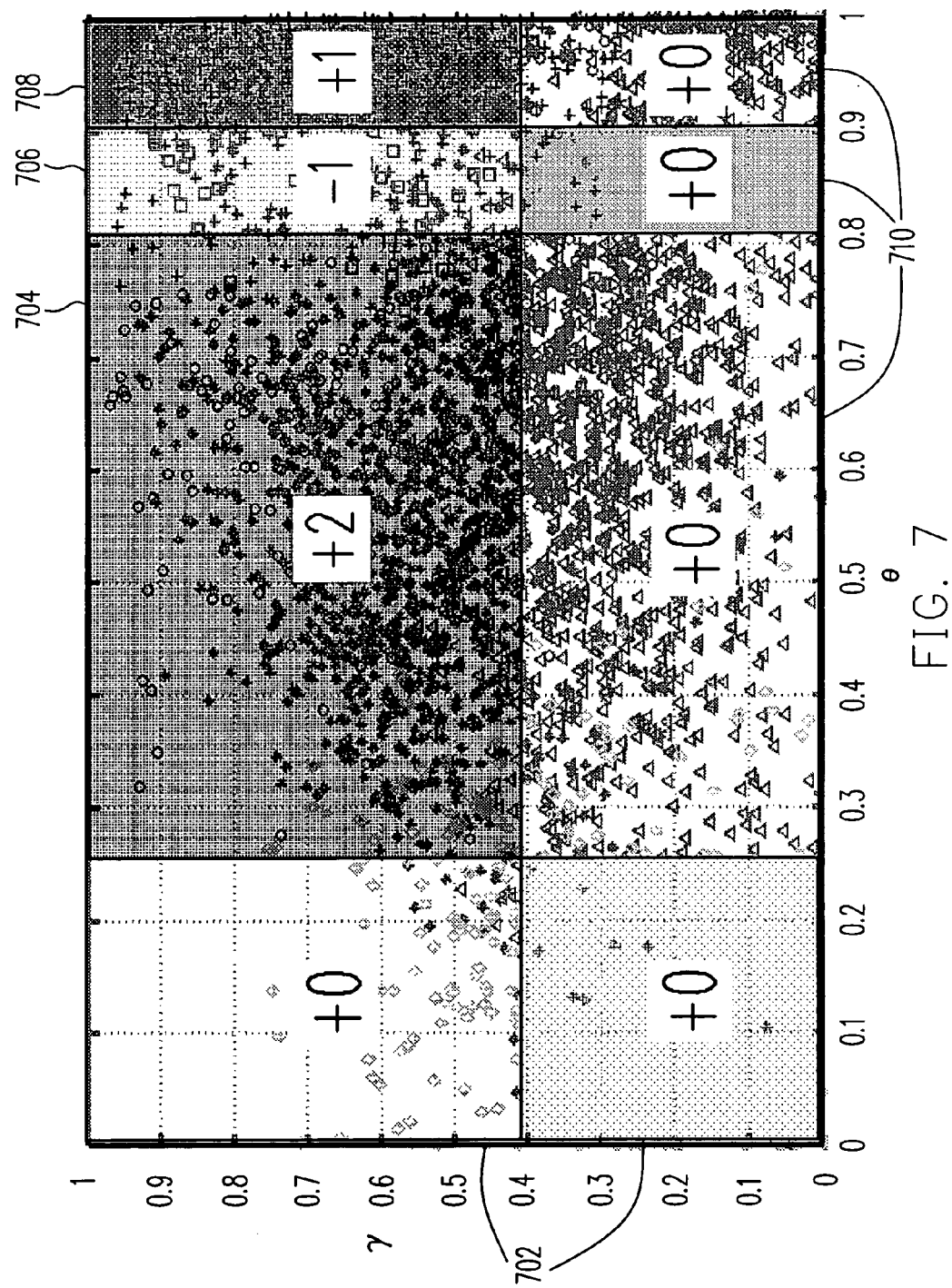
FIG. 7 is a exposure compensation zone diagram using a coordinate system of angle-distance, according to an embodiment of the present invention.

To more clearly distinguish the typical scenes from one another, the above-described coordinate system can be converted into a coordinate system of angle-distance ($\theta$-$\gamma$). Subsequently, all the coordinate points corresponding to the image samples are illustrated in FIG. 7, which includes an exposure compensation zone diagram using a coordinate system of angle-distance according to an embodiment of the present invention. In FIG. 7, represents the angular separation between the radius line of a coordinate point (a connecting line between the point and the original point) and the abscissa in FIG. 6; and represents the summation value of the corresponding bright area ratio (X, the abscissa value in FIG. 6) and the corresponding dark area ratio (Y, the ordinate value in FIG. 6). It is noticeable that the image coordinate points corresponding to different scenes in the angle-distance coordinate system are always distributed in cluster form.

Furthermore at the sub-step 412, it is for defining all of the sub-ranges. Since the image coordinate points corresponding to the different scenes in the angle-distance coordinate system are always distributed in cluster form as shown in FIG. 7; therefore, the angle-distance coordinate system can be divided into several blocks to distinguish the sub-ranges corresponding to a highlight scene, a normal front-lighting, a back-lighting, a strong back-lighting, a strong front-lighting, and a dark scene. The sub-ranges are arranged as shown in FIG. 7, where the blocks 702, 704, 706, 708 and 710 represent the highlight scene, the back-lighting and strong back-lighting, the strong front-lighting, the dark scene, and the normal front-lighting, respectively. In the embodiment, the back-lighting and the strong back-lighting belong to the same block 704, hence they have the same exposure compensation value. Corresponding to all of the scenes, the exposure compensation values are +0, +1, −1, +2 and +0, respectively.

Figure 8:
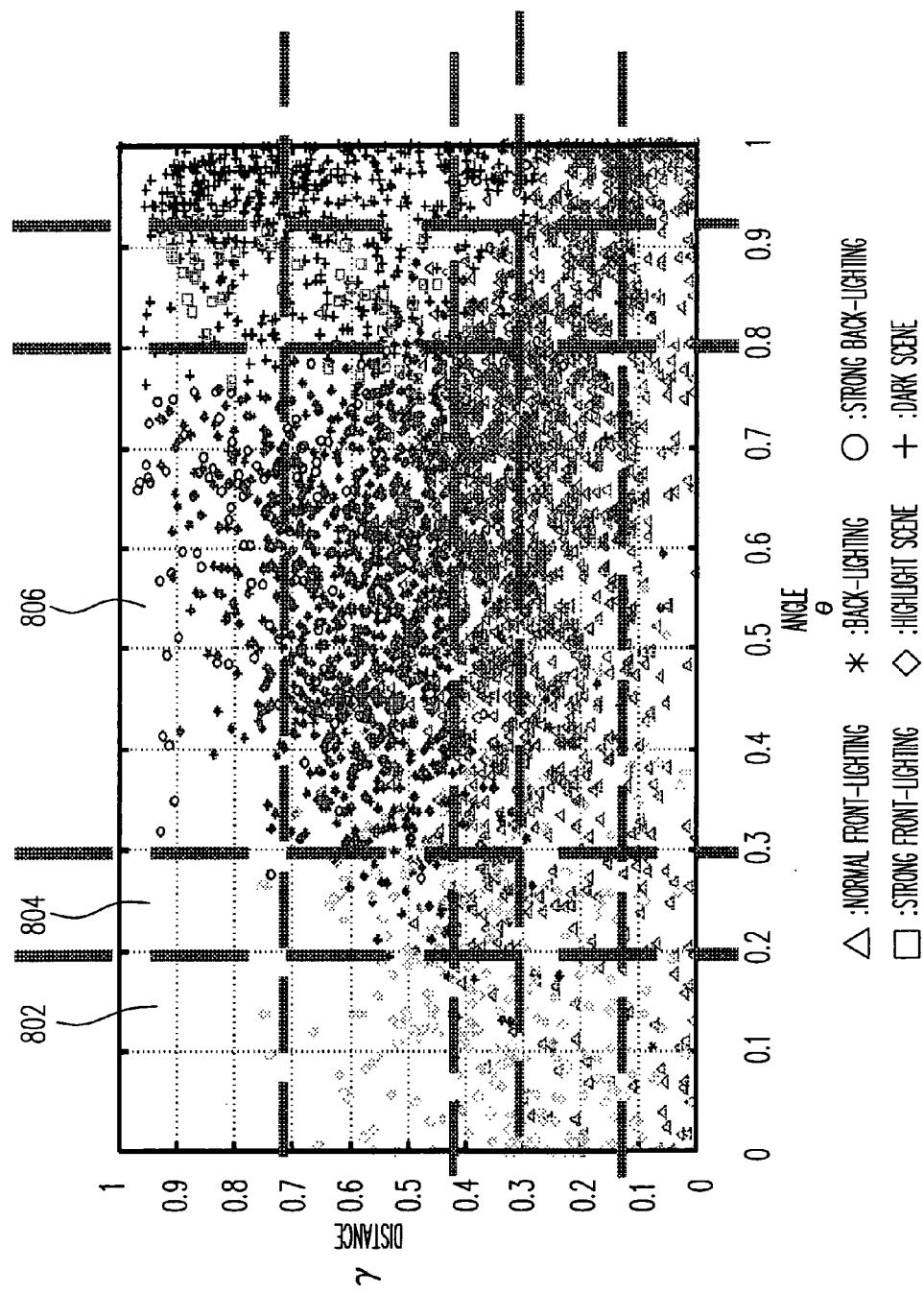
FIG. 8 is another exposure compensation zone diagram using a coordinate system of angle-distance, according to an embodiment of the present invention.
Figure 9:
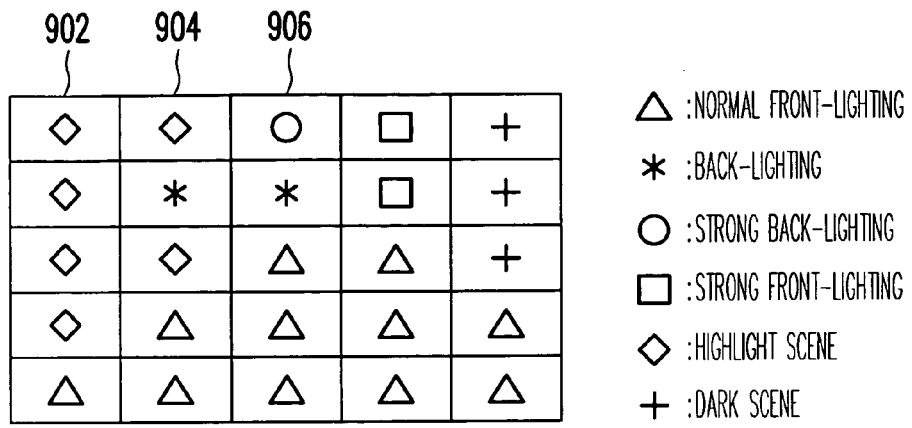
FIG. 9 is an exposure difference table according to an embodiment of the present invention.

Except for the above-described sub-ranges, for a more accurate exposure compensation, a person skilled in the art can further define all of the sub-ranges depending on the accuracy requirements. For example, the above-described angle-distance coordinate system can be further divided into more blocks. FIG. 8 is another exposure compensation zone diagram using a coordinate system of angle-distance according to an embodiment of the present invention, where there are 25 blocks in total with different exposure compensation values corresponding to FIG. 9, which is an exposure difference table according to an embodiment of the present invention. Therefore, each block in FIG. 8 corresponds to one of the exposure difference value in FIG. 9. For example, the blocks 802, 804 and 806 in FIG. 8 correspond to the boxes 902, 904 and 906 in FIG. 9. In the embodiment, the normal front-lighting region (i.e. the above-mentioned normal front-lighting sub-range) and the highlight scene region are counted under the normal light source conditions, as a result the EV adjustment is not needed. The back-lighting region and the strong back-lighting region require a supplementary lighting. In addition, the exposure difference value is assigned by a positive value due to an excessively dark principal object, and in particular, a larger exposure difference value is assigned to the strong back-lighting region. The strong front-lighting required reduced lighting and the corresponding exposure difference value is accordingly assigned by a negative value due to an excessively bright principal object. The dark scene region requires supplementary lighting for improving the brightness of the overall photograph image, and the exposure difference value should be a positive value due to an excessively low overall brightness. From the above described, the established exposure difference table is able to handle different scene conditions for proper corresponding exposure compensation.

After defining the sub-ranges, i.e. after the final sub-step 412 of step 302 in FIG. 4, it arrives at the next step, step 304. Referring to FIG. 3 again, the step 304 is for setting a bright region threshold value and a dark region threshold value inside the luminance histogram. After the image data is inputted, it comes to step 306, where a bright area ratio of the image is calculated. That is, a ratio of the pixel count of the pixels with a luminance higher than the bright region threshold value over the total image pixel count in the image is calculated. Then, it comes to step 308, where a dark area ratio of the image is calculated. That is, a ratio of the pixel count of the pixels with a luminance lower than the dark region threshold value over the total image pixel count in an image is calculated. At the step 310, the image position in the coordinate system is determined based on the corresponding bright area ratio and the dark area ratio.

Figure 10:
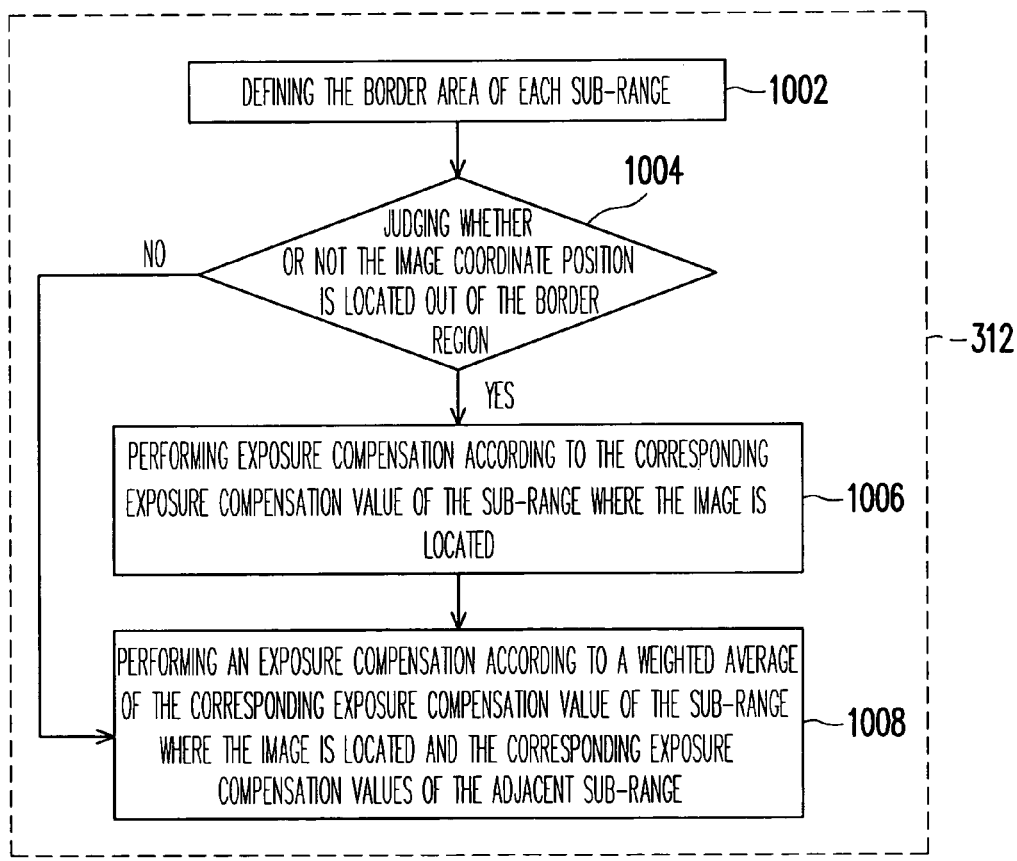
FIG. 10 is a flowchart for defining an exposure compensation value according to an embodiment of the present invention.

Furthermore at step 312, according to the sub-range where the image is located and the corresponding exposure compensation value, the EV of the image is compensated. The step 312 can be further divided into four sub-steps. FIG. 10 is a flowchart of defining an exposure compensation value according to an embodiment of the present invention. Referring to FIG. 10, at a first sub-step 1002, a border region of every sub-range is defined. In the following sections, the purpose and procedure for defining the border regions are described.

Figure 11:
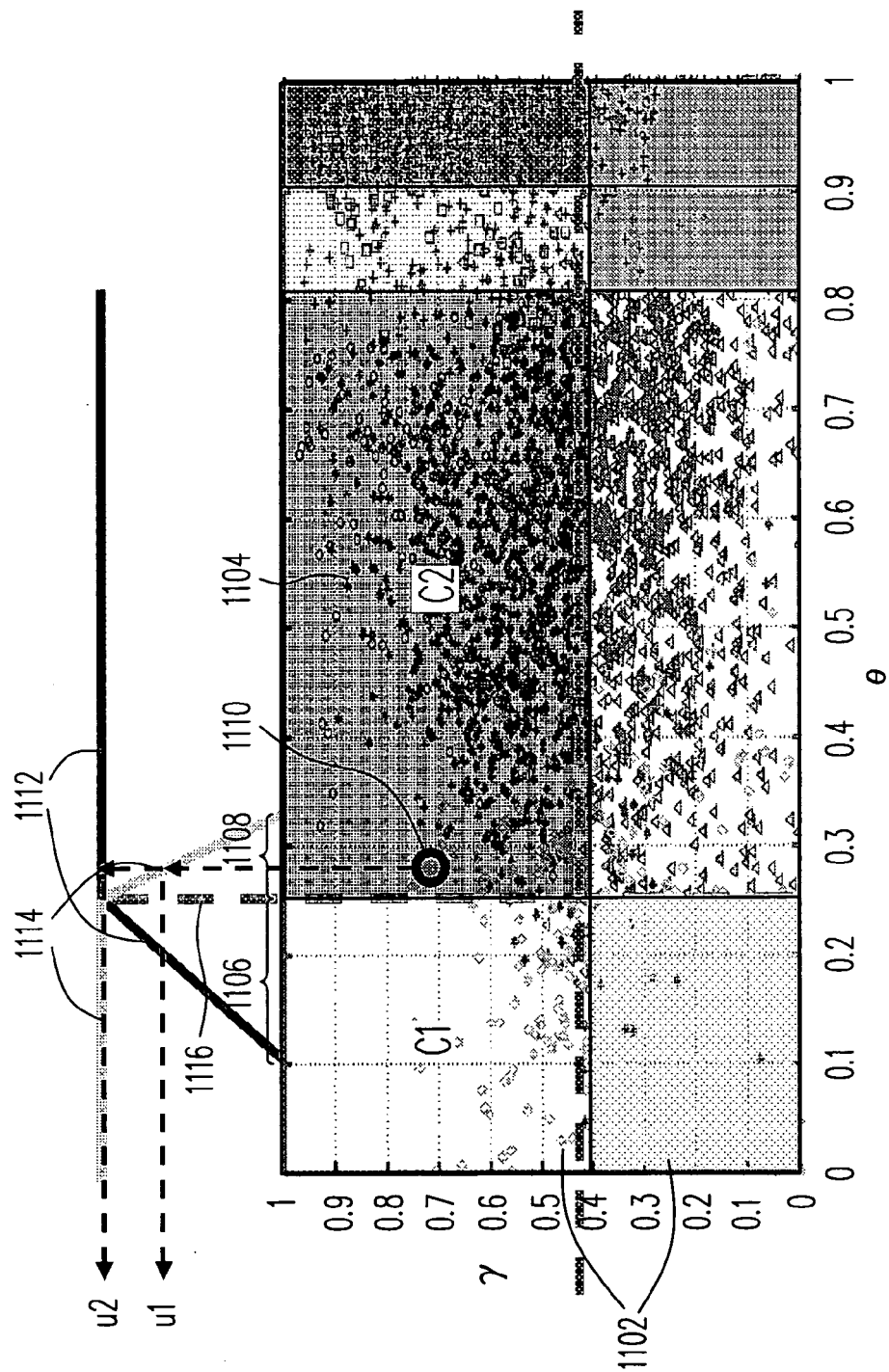
FIG. 11 is a plotted diagram illustrating the weighted average algorithm of a plurality of exposure compensation values according to an embodiment of the present invention.

As the coordinate point corresponding to an image falls in one of the above-described sub-ranges, the corresponding exposure difference value of the sub-range is used for exposure compensation. However, sometime the situation is somewhat complicated. That is, the scene category represented by the sub-range may not be the suitable scene category for the image. To overcome the aforementioned problem, the corresponding exposure compensation value of the sub-range where the coordinate point is located and the exposure compensation value of adjacent range are taken for a weighted average calculation; and the weighted average result is utilized as the exposure compensation value of the image. FIG. 11 is a plotted diagram showing the weighted average algorithm of the exposure compensation values according to an embodiment of the present invention. Referring to FIG. 11, a sub-range 1102 is corresponded to a highlight scene. A border region 1106 represents the range where the image samples of back-lighting and strong front-lighting are distributed in the most concentrated fashion, and the region 1106 is still belongs to the sub-range 1102. A border region 1108 represents the range where the image samples of highlight scene are distributed in the most concentrated fashion, and the region 1108 is still belongs to the sub-range 1104. In another words, a border region of the current sub-range is defined by the image samples of the scene category corresponding to the adjacent sub-range to obtain the most concentrated distribution in the current sub-range. The aforementioned definition is applicable to other border regions. A coordinate point 1110 represents a coordinate point of a highlight scene but is located in the sub-range 1104 (of back-lighting and strong front-lighting). C1 represents the corresponding exposure compensation value of the sub-range 1102. C2 represents the corresponding exposure compensation value of the sub-range 1104. A curve 1112 represents the C2 proportion line which has a value of '1' within the sub-range 1104, and is linearly declined to '0' from the border line 1116 between the sub-range 1102 and the sub-range 1104 to the border of the range where the image samples of the corresponding scene of the sub-range 1104 is distribute in the most concentrated fashion and is still belonging to the sub-range 1102 (i.e. the edge of the border region 1106). A curve 1114 represents the C1 proportion line, which has a value of '1' within the sub-range 1102 and is linearly declined to '0' from the border line 1116 between the sub-range 1102 and the sub-range 1104 to the border of the range where the image samples of the corresponding scene of the sub-range 1102 is distributed in the most concentrated fashion and is still belonging to the sub-range 1104 (i.e. the edge of the border region 1108). A u1 represents a proportion value on the curve 1114 corresponding to the coordinate point 1110; u2 represents a proportion value on the curve 1112 corresponding to the coordinate point 1110.

When the coordinate point 1110 of the highlight scene is fallen in the sub-range 1104 (back-lighting and strong front-lighting), the corresponding weighted average exposure compensation value can be calculated by the following equation (1):

$$\text{Weighted Average Exposure Compensation Value} = \frac{C1 \times u1 + C2 \times u2}{u1 + u2} \quad (1)$$

The equation (1) is not limited to the coordinate points, which are fallen in the border region between the sub-range 1102 and the sub-range 1104. In fact, equation (1) can be used for calculating the weighted average exposure compensation values of the coordinate points, which are fallen in other border regions.

After the border regions are defined (i.e. the sub-step 1002 in FIG. 10 is finished), it comes to the next sub-step, step 1004. Referring to FIG. 10, the sub-step 1004 is for determining whether or not the position of an image in the coordinate system is fallen out of a border region. If yes, it then comes to sub-step 1006 where the corresponding exposure compensation value of the sub-range which the image position is fallen in is used as the exposure compensation value. If no, it comes to the sub-step 1008 where the corresponding exposure compensation value of the sub-range in which the image position is fallen in and the corresponding exposure compensation value of the adjacent sub-range are used for the weighted averaging calculation for an exposure compensation.

In the above-described automatic exposure control method, the step 306 and the step 308 in FIG. 3 have no noticeable priority and can be interchanged among each other. Similarly, the sub-step 406 and the sub-step 408 in FIG. 4 have no noticeable priority and can be interchanged among each other as well. The sub-step 1004 in FIG. 10 is also not limited to judge whether or not the position of an image in the coordinate system has fallen out of a border region. It is also used to judge whether or not the position of an image in the coordinate system has fallen within a border region. Thus, the sub-step 1006 and the sub-step 1008 would be performed depending upon a result of a judgment.

Figure 12:
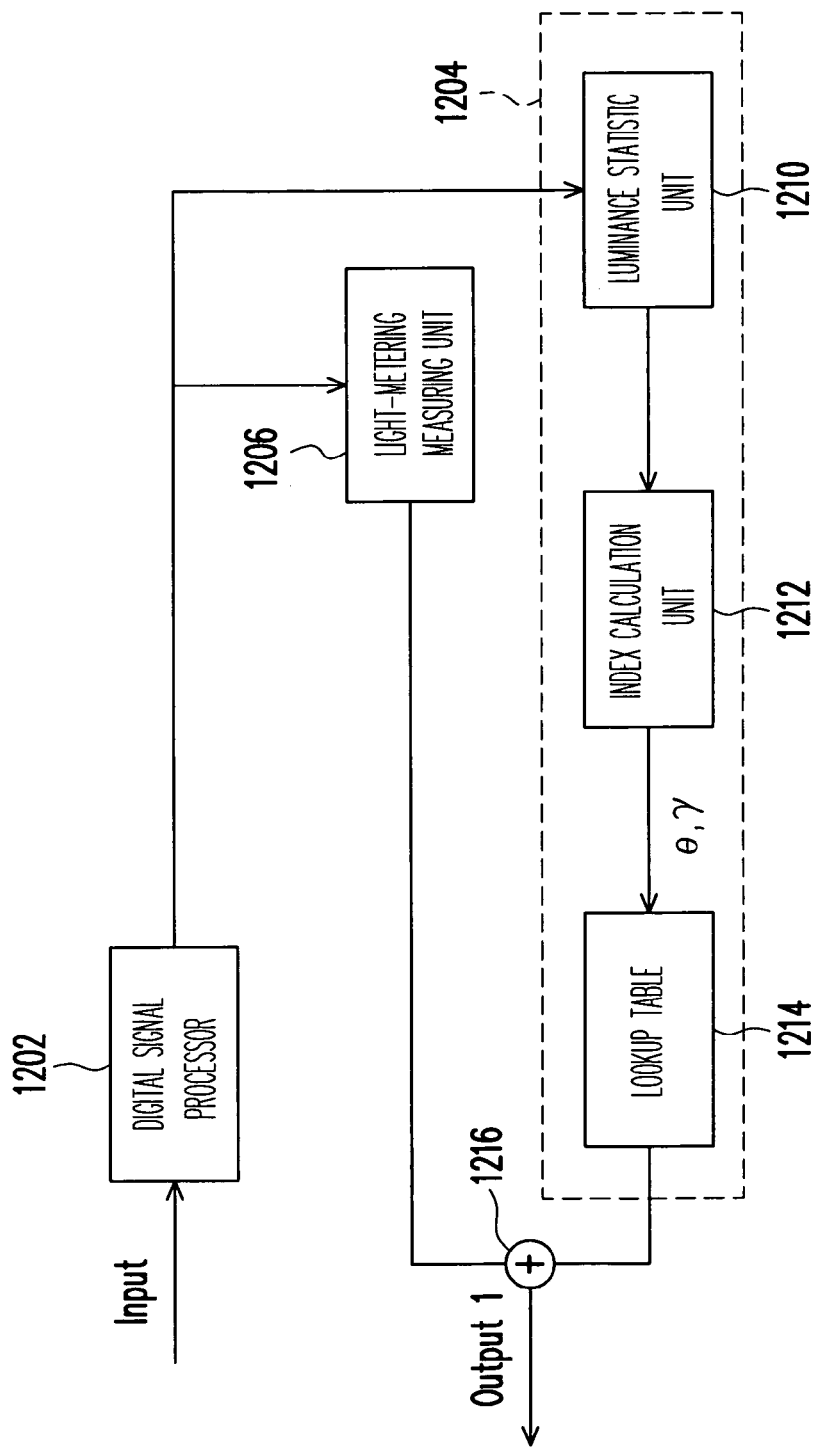
FIG. 12 is a block diagram of a digital image acquisition device in an automatic exposure compensation apparatus according to an embodiment of the present invention.

FIG. 12 is a block diagram of a digital image acquisition device in an automatic exposure compensation apparatus according to an embodiment of the present invention. The digital image acquisition device in FIG. 12 includes a digital signal processor 1202, an automatic exposure compensation apparatus 1204, a light-metering unit 1206, and an adder 1216. The automatic exposure compensation apparatus 1204 includes a luminance statistic unit 1210, an index calculation unit 1212, and a lookup table 1214. In addition, in FIG. 12, 'Input' represents the image data input, θ and γ represent the indexes, i.e. an abscissa value and an ordinate value in the angle-distance coordinate system, respectively.

The digital signal processor 1202 in FIG. 12 receives an image data input 'Input' for performing an image processing, followed by outputting of the processed image data to the light-metering unit 1206 and the luminance statistic unit 1210. The luminance statistic unit 1210 performs statistical tabulation on the image data for obtaining the bright region pixel count corresponding to the pixels with a luminance higher than the bright region threshold value and a statistical tabulation on the image data for obtaining the dark region pixel count corresponding to the pixels with a luminance lower than the dark region threshold value. The above-mentioned bright region threshold value and dark region threshold value are predetermined. The index calculation unit 1212 is coupled to the luminance statistic unit 1210 for generating at least an index according to the bright region pixel count and the dark region pixel count.

In another embodiment, the luminance statistic unit 1210 further is used for calculating a ratio of the bright region pixel count over the total image pixel count and a ratio of the dark region pixel count over the total image pixel count, so that a bright area ratio and a dark area ratio of the image are obtained, respectively. The index calculation unit 1212 would generate at least an index according to the output of the bright area ratio and the dark area ratio from the luminance statistic unit 1210.

In the embodiment, the index calculation unit 1212 generates the indexes $\theta$ and $\gamma$ according to the bright area ratio and the dark area ratio, and outputs the indexes to the lookup table 1214, where a corresponding exposure compensation value according to the indexes is accordingly outputted. Afterwards, the adder 1216 performs a summation on the output from the light-metering unit 1206 and the exposure compensation value output from the lookup table 1214; and an exposure control value Output1 is outputted. In the end, the digital image acquisition unit (a digital camera, for example) shall determine how to change an exposure compensation in accordance to the exposure control value Output1 (for example, by controlling the shutter and the aperture of the digital camera based on the exposure control value). The content of the above-described lookup table 1214 must be pre-established according to a procedure, which is explained in detail hereinafter in FIG. 14.

Figure 13:
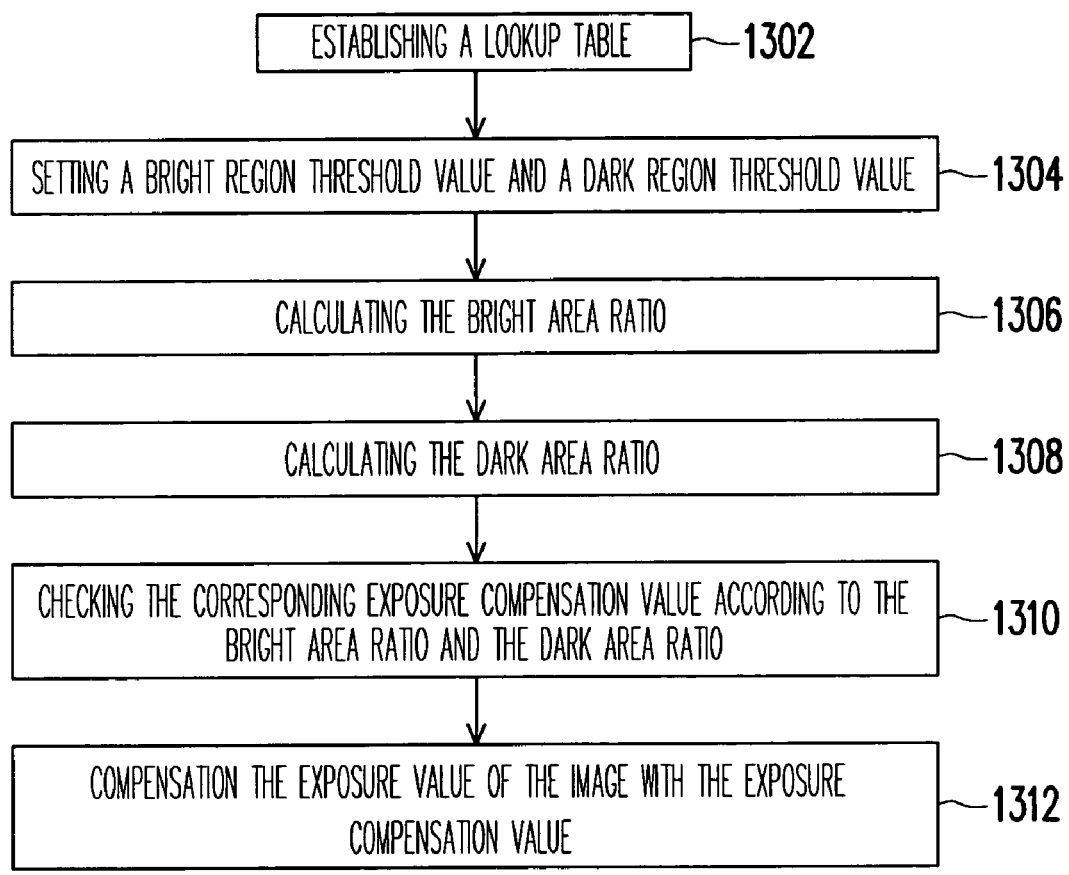
FIG. 13 is a flowchart of an automatic exposure control method according to another embodiment of the present invention.
Figure 14:
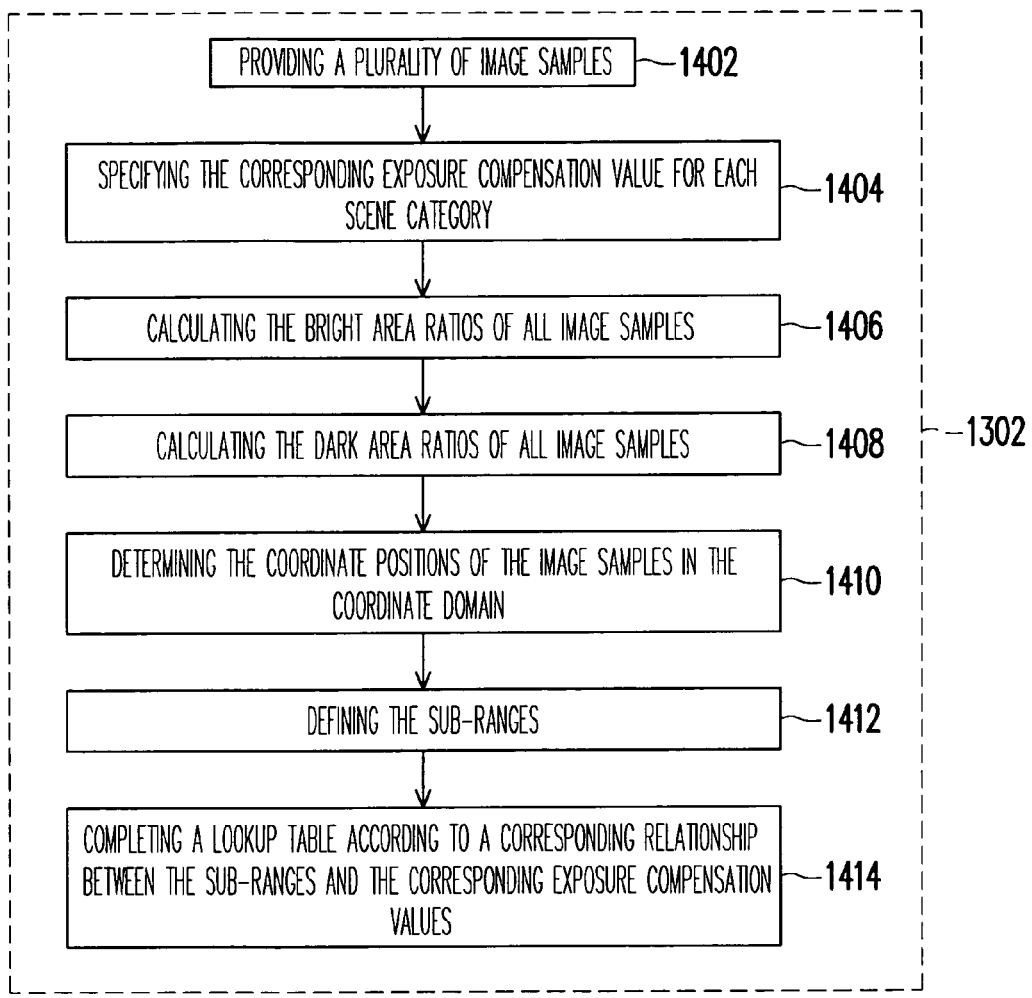
FIG. 14 is a flowchart for establishing a lookup table according to another embodiment of the present invention.

According to the scheme of exposure control and compensation of the present invention, the automatic exposure control method can be implemented according to another embodiment as shown in FIG. 13. FIG. 13 is a flowchart of an automatic exposure control method according to another embodiment of the present invention, in which there are six steps in total. First at a step 1302, a lookup table is established, which can be divided into seven sub-steps as shown in FIG. 14. FIG. 14 is a flowchart for establishing a lookup table according to another embodiment of the present invention. In which, a plurality of steps 1402, 1404, 1406, 1408, 1410 and 1412 are the same as the sub-steps 402, 404, 406, 408, 410 and 412 in FIG. 4. For the sake of simplicity, its further description shall be omitted. However, the sub-step 1414 after the sub-step 1412 is a step of which FIG. 4 does not possesses. At the sub-step 1414, a lookup table is to be completed according to a corresponding relationship between the sub-ranges and the corresponding exposure compensation values. Once the sub-step 1414 is completed, the step 1302 for establishing a lookup table in FIG. 13 is completed as well, followed by a plurality of steps 1304, 1306 and 1308. Referring to FIG. 13 once again, the steps 1304, 1306, and 1308 are the same as the steps 304, 306 and 308 in FIG. 3. After the step 1308, in which a bright area ratio and a dark area ratio are calculated, a step 1310 is to be performed. At the step 1310, a corresponding exposure compensation value of the image is obtained from the lookup table according to the bright area ratio and the dark area ratio. In the end at a step 1312, the exposure value (EV) of the image is compensated according to the exposure compensation value.

Figure 15:
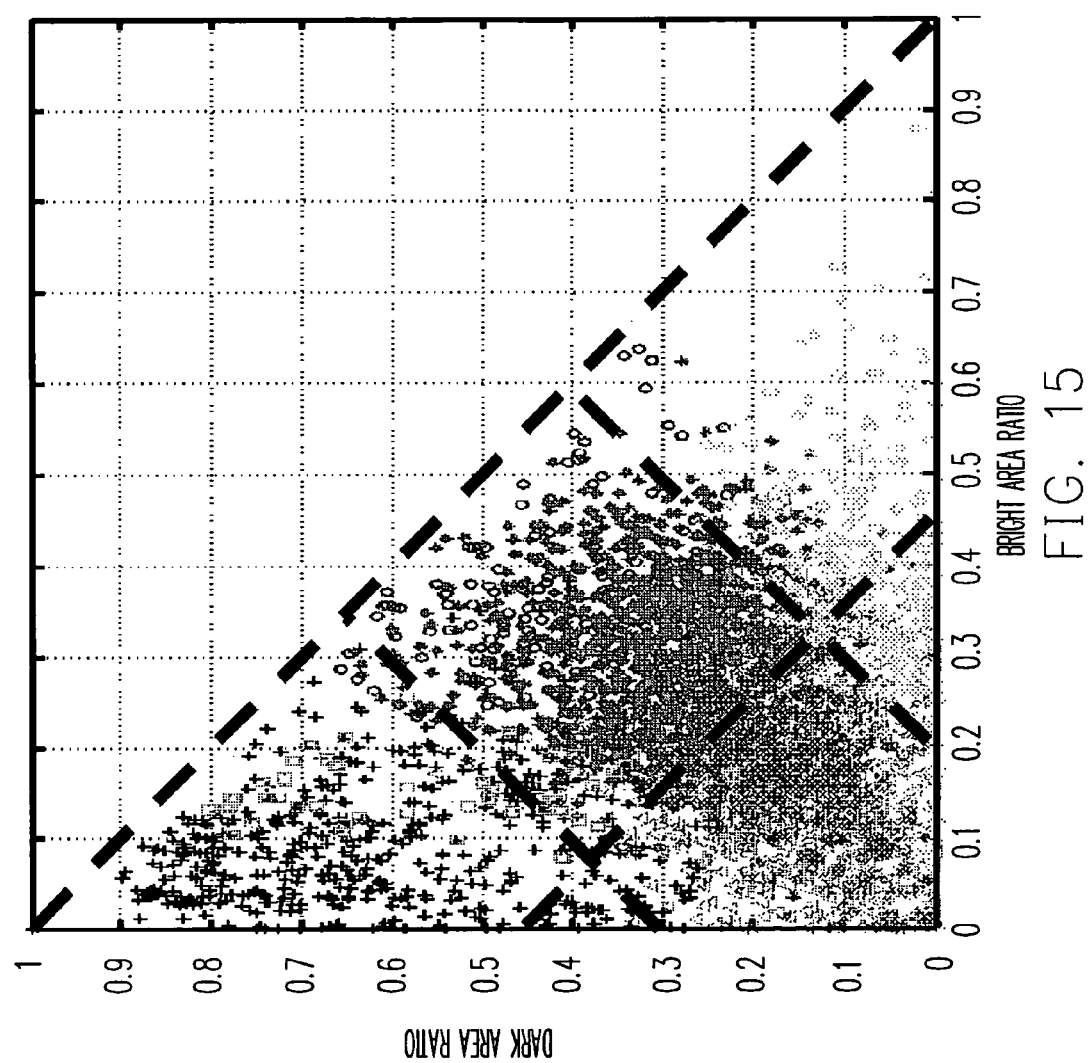
FIG. 15 is a coordinate system diagram according to another embodiment of the present invention.

FIG. 15 is a coordinate system diagram according to another embodiment of the present invention. In FIG. 15, on a coordinate plane formed by the bright area ratio of images (abscissa) and the dark area ratio of images (ordinate), a large number of statistical image data are plotted with corresponding coordinate points. Furthermore, the coordinate plane is divided into a plurality of blocks, which are identified as a highlight scene, a normal front-lighting, a back-lighting and strong front-lighting, and a strong front-lighting, and a dark scene. Referring to FIG. 15, the automatic exposure control method can be described as follows: first, the exposure value selected by the first exposure is used for determining whether or not the photographic scene is a dark scene; if it is a dark scene, the procedure then follows the supplementary lighting method of a dark scene for correcting the exposure; if it is not a dark scene, the summation of the bright area ratio and the dark area ratio (i.e. the sum of the abscissa value and the ordinate value) and the difference between the bright area ratio and the dark area ratio (i.e. the difference between the abscissa value and the ordinate value) are used for determining in which block the photographic image position is fallen in. Then, an exposure difference is obtained from an inspection of the exposure difference table established by all corresponding blocks. As a result, there is no need to perform a coordinate system conversion (to convert a coordinate system formed by the bright area ratio and the dark area ratio into a coordinate system formed by angle and distance) for achieving the goal of automatic exposure correction. Therefore, the overall operation is simplified and accomplishes hardware savings.

In summary, the automatic exposure control method is able to perform an appropriate exposure compensation on photographic scenes under conditions of back-lighting, strong front-lighting, or dark scene. For a scene under a condition of normal front-lighting or highlight scene, the original exposure value can be kept as well. Therefore, a scene can be photographed on an image frame with a much clearer and more realistic lifelike quality.

It will be apparent to those skilled in the art that various modifications and variations can be made to the structure of the present invention without departing from the scope or spirit of the invention. In view of the foregoing, it is intended that the specification and examples to be considered as exemplary only, with a true scope and spirit of the invention being indicated by the following claims and their equivalents.

What is claimed is:

1. An automatic exposure control method, used for determining a exposure compensation value of an image, comprising:

establishing a coordinate system, wherein a plurality of sub-ranges with a plurality of different corresponding exposure compensation values in the coordinate system;

setting a bright region threshold value and a dark region threshold value;

calculating a ratio of the pixel count in an image, wherein the luminance of each pixel is higher than the bright region threshold value over the total image pixel count, for obtaining a bright area ratio;

calculating the ratio of the pixel count in an image, wherein the luminance of each pixel is lower than the dark region threshold value over the total image pixel count, for obtaining a dark area ratio;

determining the coordinate positions of the image in the coordinate system according to the bright area ratio and the dark area ratio; and compensating a exposure value of the image with the corresponding exposure compensation value of the sub-range where the image is located when the position of image in the coordinate system is fallen inside one of the sub-ranges.

2. The automatic exposure control method as recited in claim 1, wherein the step for establishing the coordinate system comprises:

providing a plurality of image samples, wherein the image samples belong to one of a plurality of scene categories;

specifying the corresponding exposure compensation value for each scene category;

calculating the ratios of the pixel counts in the image sample, wherein the luminance of each pixel is higher than the bright region threshold value over the corresponding total image pixel count, for obtaining the bright area ratios of all image samples;

calculating the ratios of the pixel counts in the image sample, wherein the luminance of each pixel is lower than the dark region threshold value over the corresponding total image pixel count, for obtaining the dark area ratios of all image samples;

according to the bright area ratios and the dark area ratios of all image samples, determining the positions of the image samples in the coordinate system; and defining the sub-ranges according to the distribution of the image samples.

3. The automatic exposure control method as recited in claim 2, wherein the scene categories comprise highlight scene, normal front-lighting, back-lighting, strong back-lighting, strong front-lighting, and dark scene.

4. The automatic exposure control method as recited in claim 1, wherein the steps for compensating the exposure value of the image with the corresponding exposure compensation value of the sub-range where the image locates comprise:

defining a border region near the border of the sub-range in every sub-range, respectively;

taking the corresponding exposure compensation value of the sub-range as the exposure compensation value of the image when the image position in the coordinate system is fallen in one of the sub-ranges but out of the border region of the sub-range; and taking the corresponding exposure compensation value of the sub-range where the image is located and the corresponding exposure compensation value of the adjacent sub-range for a weighted averaging result and taking the weighted averaging result to be the exposure compensation value of the image when the position of image in the coordinate system is fallen into one of the sub-ranges and within the border region of the sub-range.

5. The automatic exposure control method as recited in claim 4, wherein if one of the sub-ranges is a current sub-range, the border region of the current sub-range is defined by the range in the current sub-range where the image samples of the scene category corresponding to the sub-range adjacent to the current sub-range is to obtain the most concentrated distribution in the current sub-range.

6. The automatic exposure control method as recited in claim 1, wherein the method is used for the exposure control of a digital image acquisition apparatus.

7. The automatic exposure control method as recited in claim 6, wherein the digital image acquisition apparatus comprises a digital camera.

8. An automatic exposure control method, used for determining a exposure compensation value of an image, comprising:

establishing a lookup table;

setting a bright region threshold value and a dark region threshold value;

calculating a ratio of a pixel count in the image wherein the luminance of each pixel is higher than the bright region threshold value over the total image pixel count, for obtaining a bright area ratio;

calculating the ratio of the pixel count in the image, wherein the luminance of each pixel is lower than the dark region threshold value over the total image pixel count, for obtaining a dark area ratio;

determining the corresponding exposure compensation value of the image in the lookup table according to the bright area ratio and the dark area ratio; and compensating the exposure value of the image with the corresponding exposure compensation value.

9. The automatic exposure control method as recited in claim 8, wherein the steps for establishing the lookup table comprise:

providing a plurality of image samples, wherein the image samples belong to one of a plurality of scene categories;

specifying the corresponding exposure compensation value for each scene category;

calculating the ratios of the pixel counts in the image sample, wherein the luminance of each pixel is higher than the bright region threshold value over the corresponding total image pixel count, for obtaining bright area ratios of all image samples;

calculating the ratios of the pixel counts in the image sample, wherein the luminance of each pixel is lower than the dark region threshold value over the corresponding total image pixel count, for obtaining dark area ratios of all image samples;

according to the bright area ratios and the dark area ratios of all image samples, determining the positions of the image samples in a coordinate system;

defining the sub-ranges according to the distribution of the image samples and according to a corresponding relationship between the sub-ranges and the corresponding exposure compensation values for completing the lookup table.

10. The automatic exposure control method as recited in claim 9, wherein the scene categories comprise highlight scene, normal front-lighting, back-lighting, strong back-lighting, strong front-lighting, and dark scene.

11. The automatic exposure control method as recited in claim 8, wherein the method is used for the exposure control of a digital image acquisition apparatus.

12. The automatic exposure control method as recited in claim 11, wherein the digital image acquisition apparatus comprises a digital camera.

13. An automatic exposure compensation apparatus for determining a exposure compensation value of an image, comprising:

a luminance statistic unit, used for counting bright region pixel count for pixels with a luminance higher than a predetermined bright region threshold value in the image and counting dark region pixel count for the pixels with the luminance lower than a predetermined dark region threshold value in the image;

an index calculation unit, coupled to the luminance statistic unit, for generating at least an index according to the bright region pixel count and the dark region pixel count; and a lookup table, coupled to the index calculation unit, for obtaining the exposure compensation value according to the index, and outputting the exposure compensation value.

14. The automatic exposure compensation apparatus as recited in claim 13, wherein the luminance statistic unit further calculates the ratio of the bright region pixel count over the pixel count in the image for obtaining a bright area ratio and the ratio of the dark region pixel count over the pixel count in the image for obtaining a dark area ratio; and the index calculation unit further generates the index according to the bright area ratio and the dark area ratio.

15. The automatic exposure compensation apparatus as recited in claim 13, wherein the method for the lookup table for obtaining the exposure compensation value according to the index comprises:

establishing a coordinate system, wherein a plurality of sub-ranges with a plurality of different corresponding exposure compensation values in the coordinate system;

determining the coordinate position of the image in the coordinate system according to the index; and outputting the corresponding exposure compensation value of the sub-range where the image is located when the position of image in the coordinate system is fallen into one of the sub-ranges.

16. The automatic exposure compensation apparatus as recited in claim 15, wherein the steps for establishing the coordinate system comprise:

providing a plurality of image samples, wherein the image samples belong to one of a plurality of scene categories;

specifying the corresponding exposure compensation value for each scene category;

calculating the ratios of the pixel counts in the image sample, wherein the luminance of each pixel is higher than the bright region threshold value over the corresponding total image pixel count, for obtaining bright area ratios of all image samples;

calculating the ratios of the pixel counts in the image sample, wherein the luminance of each pixel is lower than the dark region threshold value over the corresponding total image pixel count, for obtaining dark area ratios of all image samples;

according to the bright area ratios of all image samples and the dark area ratios of all image samples, determining the positions of the image samples in the coordinate system; and defining the sub-ranges according to the distribution of the image samples.

17. The automatic exposure compensation apparatus as recited in claim 16, wherein the scene categories comprise highlight scene, normal front-lighting, back-lighting, strong back-lighting, strong front-lighting and dark scene.

18. The automatic exposure compensation apparatus as recited in claim 13, which is used for the exposure control of a digital image acquisition apparatus.

19. The automatic exposure compensation apparatus as recited in claim 18, wherein the digital image acquisition apparatus comprises a digital camera.

* * * * *